Figure 1:
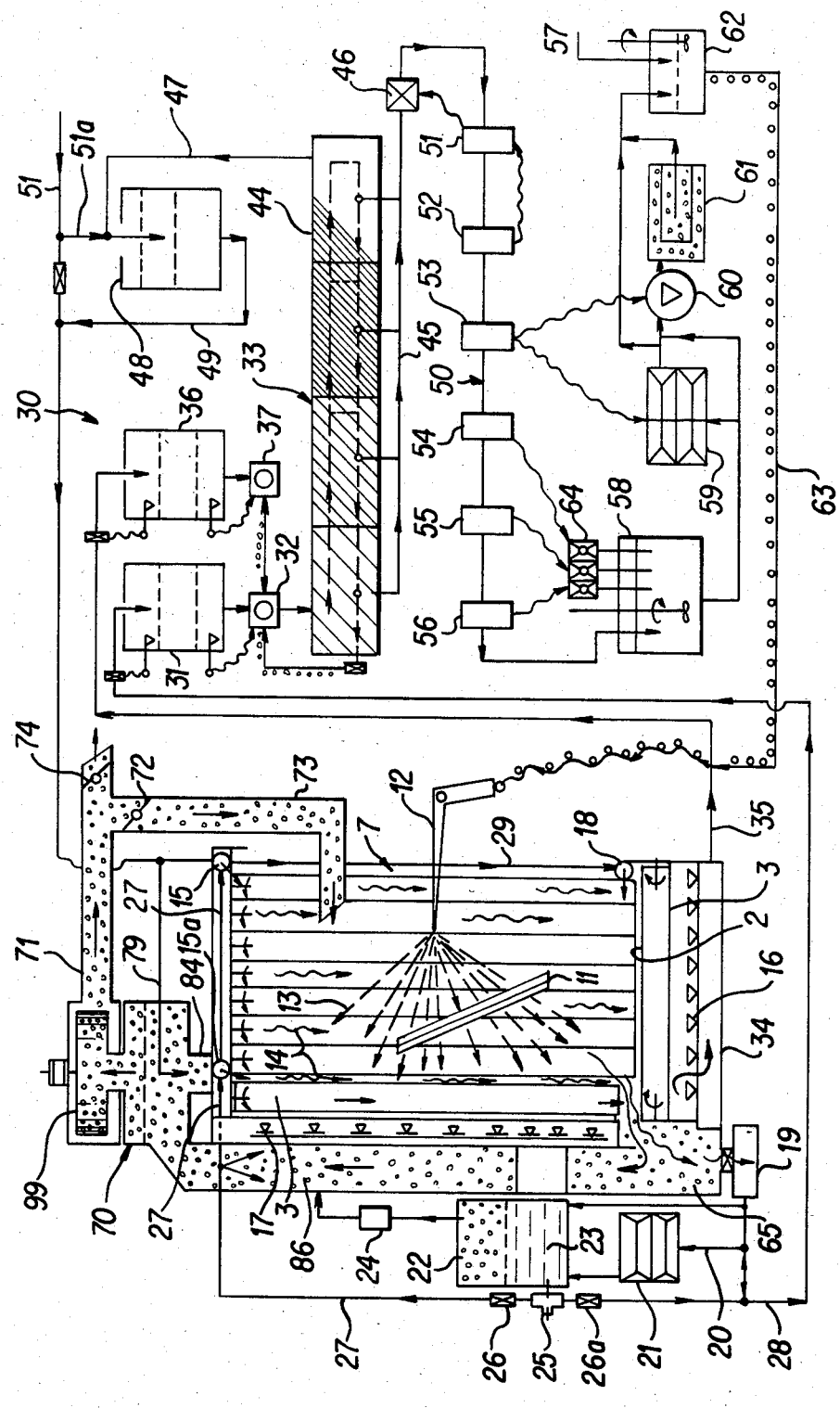

United States Patent [19]

Richter

[11] Patent Number: 4,607,592

[45] Date of Patent: Aug. 26, 1986

[54] PROCESS FOR THE RECYCLING OF PAINT MATERIAL FROM THE OVERSPRAY OCCURING DURING SPRAY PAINTING AND A DEVICE TO CARRY OUT THE PROCESS

[76] Inventor: Wolfgang Richter, Augsburger Str. 23, D-8946 Memmingerberg, Fed. Rep. of Germany

[21] Appl. No.: 649,014

[22] Filed: Sep. 10, 1984

[30] Foreign Application Priority Data

Sep. 8, 1983 [DE] Fed. Rep. of Germany ...... 3332457

[51] Int. Cl.⁴ .............................................. B05B 15/06
[52] U.S. Cl. .................... 118/689; 98/115.2; 55/DIG. 46; 118/326; 118/DIG. 7; 427/345; 427/421
[58] Field of Search ............ 98/115 SB; 55/DIG. 46; 427/345, 421; 118/326, DIG. 7, 689

[56] References Cited

U.S. PATENT DOCUMENTS

| | | | |
|---|---|---|---|
| 1,746,228 | 2/1930 | Darling | 118/DIG. 7 |
| 3,475,202 | 10/1969 | Bok | 118/326 X |
| 3,599,399 | 8/1971 | Gallen | 55/DIG. 46 X |
| 4,096,061 | 6/1978 | Brennan | 427/345 |
| 4,416,193 | 11/1983 | Sharpless | 118/326 X |
| 4,425,870 | 1/1984 | Marshke | 118/326 X |

FOREIGN PATENT DOCUMENTS 54-123245 9/1979 Japan ........................... 118/DIG. 7

*Primary Examiner*—Shrive P. Beck
*Attorney, Agent, or Firm*—Armstrong, Nikaido, Marmelstein & Kubovcik

[57] ABSTRACT

The invention concerns a process to recover paint from overspray whereby one collects paint which misses the target object by means of a collector device which is flushed on all side and floor surfaces with circulating water, concentrates the overspray extracted in the overspray-circulating water mixture from the collector device to an overspray content of approx 20%, then feeds the mixture to a filtration chamber in which the water is separated from the reclaimed raw paint, then measures the physical characteristics of the reclaimed paint, compares these with the physical characteristics of the fresh paint, then adjusts the characteristics of the reclaimed paint to the characteristics of the fresh paint material and mixes the reclaimed paint into the fresh paint. The invention also concerns as device to carry out the process.

13 Claims, 10 Drawing Figures

PROCESS FOR THE RECYCLING OF PAINT MATERIAL FROM THE OVERSPRAY OCCURING DURING SPRAY PAINTING AND A DEVICE TO CARRY OUT THE PROCESS

The invention concerns a process to recover paint material from the overspray occurring during spray painting and a device to carry out the process.

During spray painting only a part of the fine sprayed paint material reaches the target object. The part not reaching the object is called overspray. The overspray is considered as paint loss. Moreover the overspray must be disposed as it causes environmental problems. Depending on the form of the target object and on the type of the spray painting system the overspray share of the total consumption of paint material amounts to about 30 to 90%. DE-OS No. 24 33 193 refers to a process for improving the precipitation of colour fogg with a water veil, the washing water being provided with water-soluble salts for accelerating or improving, respectively, coagulation of the paint in the washing water. For improving the precipitation of the colour fogg in the washing water there are added halides, hypo-halides, sulfites, hyposulfites, nitrates, nitrites and similar salts. The known measures have the effect that the spraying fogg is coagulated immediately after contacting the water wall without causing a partial or entire dissolution of the paint. The collected waste water then is separated from the coagulated paint and subsequently the separated coagulated paint is deposited or burned. It is not possible to reuse the recovered paint. The publication "Industrie-Lackier-Betrieb", 41, 1973, pages 21 to 25, refers to a general treatise as regards wet cabins. From this publication it is known that collecting walls are sprinkled with water for collecting overspray paint. None of the described devices can be compared with the subject matter of the application since the device according to the invention does not work either with nozzles or with cascades. The known devices according to "Industrie-Lackier-Betrieb" serve to coagulate the collected overspray and to remove it from the process. A circulation of the sprayed paint is not the subject matter of the known processes.

Therefore a need exists for an industrial scale process to reclaim paint material from the overspray occuring during spray painting whereby the overspray should be reclaimed completely if possible and should be fed into the fresh paint material to be sprayed. Moreover the process should have little pollution effects and should be cost saving. Other formulations of problems will develop of the following description of the process and of the device to carry out the process and of the description of the advantages of the invented process. This task is accomplished by a process of the type described above, whereby the overspray is collected by means of a collector device which is flushed with circulating water, and the circulating water-overspray mixture then is reclaimed in a recuperative device with a filtration chamber, a measuring unit and a preparation unit and then is admixed with the fresh paint material to be sprayed for the same application purpose. Morever the invention concerns a device to carry out the process of recuperation of the overspray.

The collector devices consist of surfaces with rotating segments. The individual rotating segments preferably have a triangular cross section. The segments are arranged such that they form a spraying booth of which, if necessary, also the entrance side can be closed.

The size of the spraying booth depends on the object to be sprayed. Using the process invented large objects such as buses and wagons can be painted in a rational way. The process invented is also suited for small spraying booths used for painting single parts.

A special version of the device invented has a collector device consisting of continuous, smooth and non-rotating surfaces which are flooded by means of flooding slits arranged in the upper parts of the surfaces and whereby the bottom is flooded by means of a spray device.

The main parts of the spraying booth facing the target object are flooded by a calculated quantity of circulating water, preferably demineralized water.

A part of the overspray occuring in the course of the spraying process settles in the water film flooding the surfaces. Another part of the overspray is entrained by the suction air in the form of floating particles distributed in the suction air as aerosol. The sucked off air first passes a rinsing unit the function of which depends on the form of cascades or cyclonic washer. Then the precleaned exhaust air enters an invented wet after filter where it is cleaned of overspray remnants. The thus cleaned exhaust air can for the most part be mixed with the required quantity of fresh air. The overspray rinsed out and washed out of the exhaust air when passing the rinsing unit and the wet after filter is added to the circulating water containing already the settled overspray.

In order to insure that the circulation water is not enriched to an overspray content of more than 20%, through which formation of a film of the overspray consisting of paint material can occur within the spraying booth, a part of the circulated mixture is separated and fed into the filtration unit. The filters used for the device invented consist of new special membranes which were developed for the process invented. In these filters the overspray-circulation water mixture is separated into cleaned water which is returned to the water circuit and into concentrated overspray which is reclaimed as raw paint. The reclaimed raw paint is fed into an automatically controlled preparation part where the physical and chemical characteristics of the raw paint are continuously checked and compared to the corresponding values of the fresh paint material. The data obtained during the preparation are used to adjust the quality of the retained raw paint to the quality of the fresh paint material e.g. by diluting or concentrating.

The overspray-circulating water mixture must at least have a homogeneous distribution until it reaches the filtration unit. This is achieved according to the invention by an inline disperser built into the line containing the mixture.

It is of advantage if the overspray-circulating water mixture following the inline dispersion passes a relief chamber where the air or other gaseous content entrapped in the foammicelles are continuously separated from the mixture. The quantity of the circulated water is adjusted such that the overspray quantity occuring per unit of time will not exceed 20% of the quantity of the circulating water. In case of higher upgrading the fine distributed particles in the overspray-circulating water mixture come into contact to a certain degree and there is danger of partial drying or partial film formation occurring already in the spraying booths. The required amount of circulating rinsing water can be seen from the following calculation example based on a spraying booth having a length of 2 m, a width of 1.5 m and a height of 1.5 m i.e. a volume of 4.5 m³. The quantity of circulating water of 3 to 5% of the volume is about 135 to 225 l, that means that this quantity of water for an upgrading of max. 20% takes up an overspray quantity of 27 to 45 l. On the average the overspray rate occuring during the spraying process amounts to about 50%. Under conditions given up to 90 l of paint material can be sprayed per hour. Based on the calculation example the filtration must have a capacity of at least 225 l/h and of maximum 300 l/h. The subsequent preparation part for the raw paint reclaimed from the overspray must have a capacity of at least 45 l/h.

This means that the initial consumption of 90 l paint material/h during the operating time of the recycling then is reduced to a consumption of 45 l of fresh paint material and the same quantity of reclaimed paint material is added.

Conventional spraying booths use only one wall with an uncontrolled overflow, whereby very great quantities of water are used, as the overspray entrained in the water must be coagulated in the rinsing water in a superdimensioned collecting sump and must be discarded as sludgy waste product. The disposal of this waste water is connected with considerable costs and environmental load. Another disadvantage of conventional spraying booths is that they need a quantity of about 7,000 m³/h of fresh air for a volume of about 4.5 m³. For conventional spraying booths the fresh air fed to the spraying booth must be cleaned beforehand and heated or cooled depending on the season which induces considerable energy costs. Moreover the exhaust air of the known spraying booths is loaded with harmful material so that this exhaust air can not be circulated but must be discharged into the open air.

Contrary to this the process invented only uses up to a maximum of 10% of the circulated water as fresh water and only 10 to 25% of the fresh air used in conventional processes as fresh air. The aforementioned calculation example shows that the process invented functions a great deal more economically and efficiently than the known processes so that in case of the process invented the amortization period for the spraying device is less than one year.

Using the process invented and the device invented practically the entire overspray can be reused to spray the same object or even other objects. The invented process works rationally.

It is energy saving and has little pollution effects. The invented process produces no noxious substances containing effluents or harmful material containing exhaust air. The invented devices are ergonomically good because well designed air circulation enables spray and aerosol mist to be kept away from operating personnel. The invented process can be used for all normal spray painting systems and paint materials and especially, however, for water-soluble paint materials.

Figure 2:
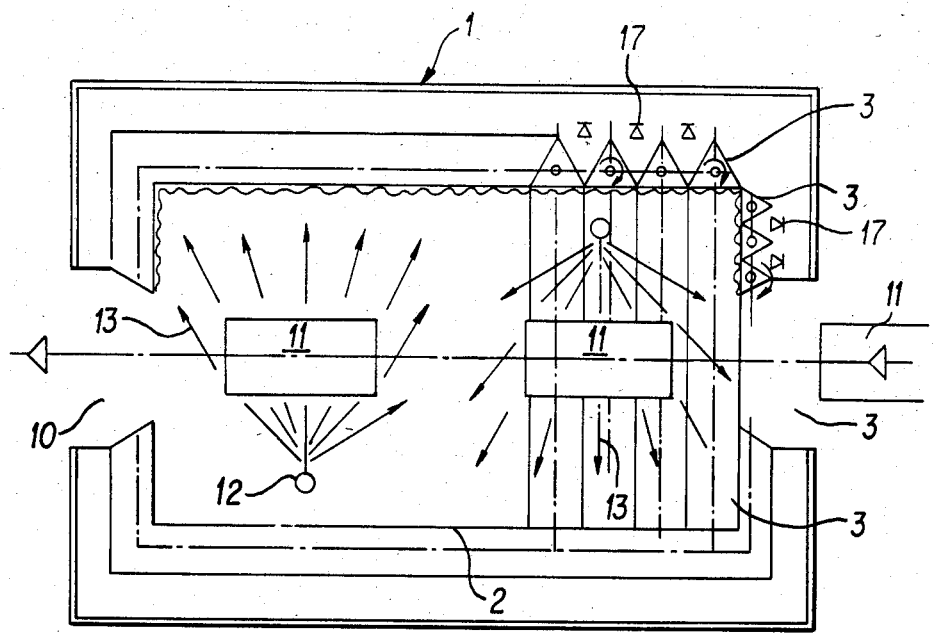
Figure 3:
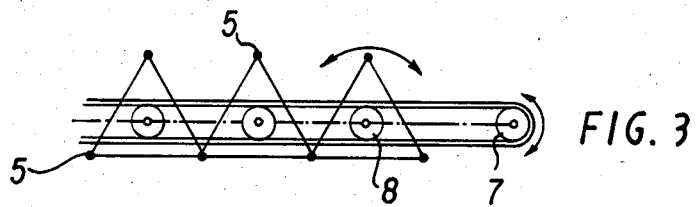
Figure 4:
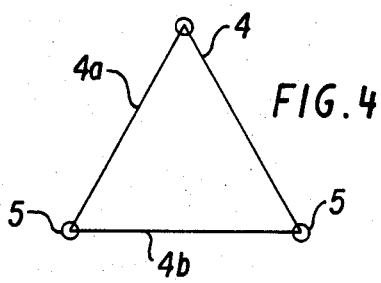
Figure 5:
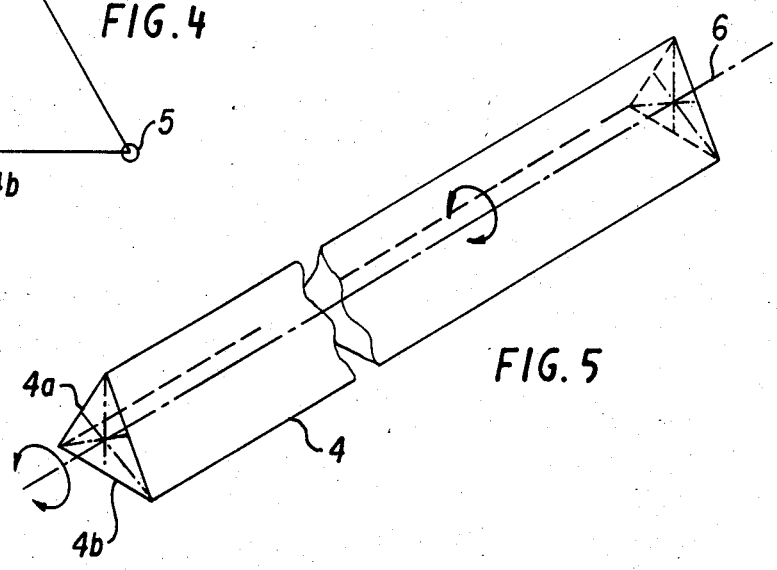
Figure 6:
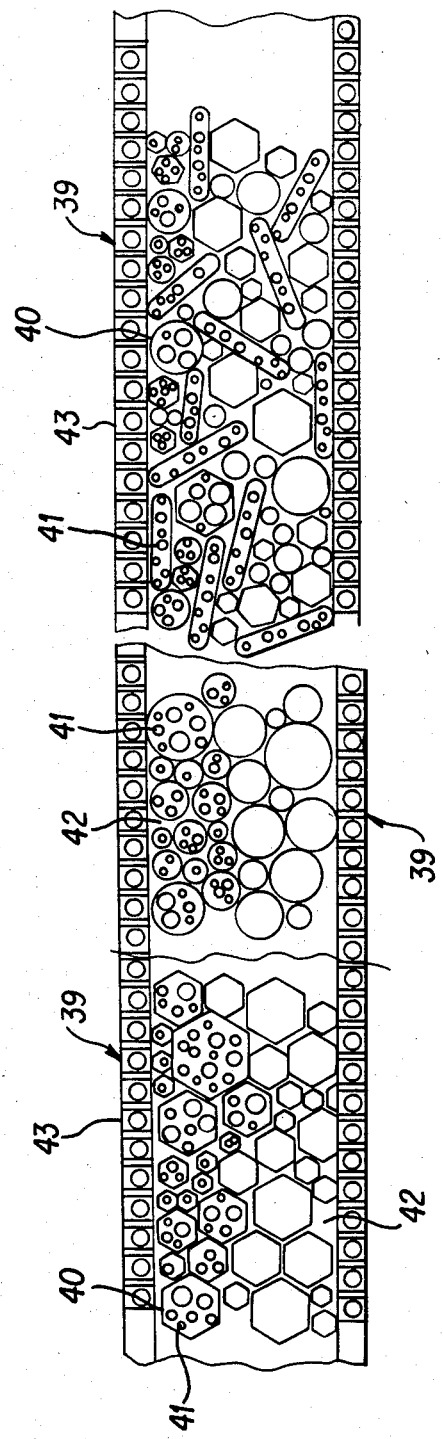
Figure 7:
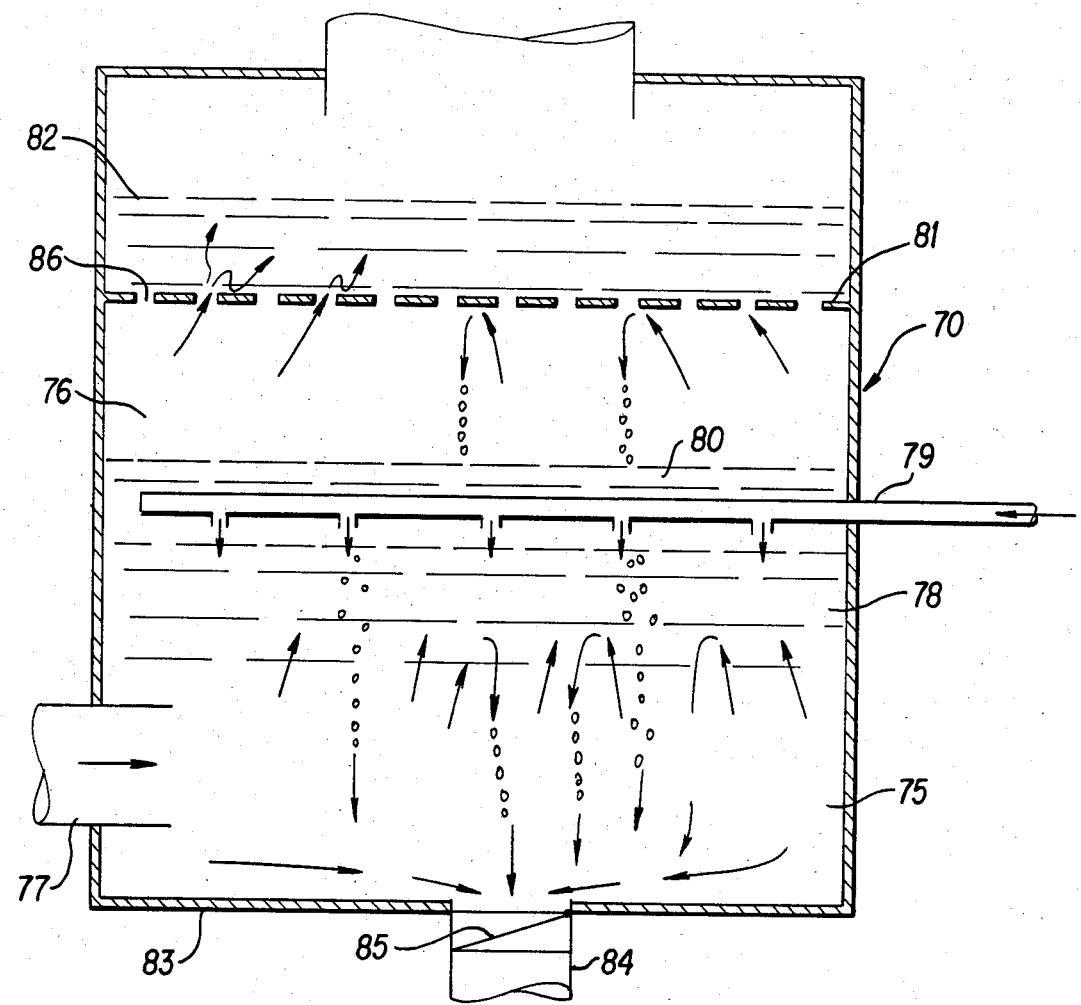
Figure 9:
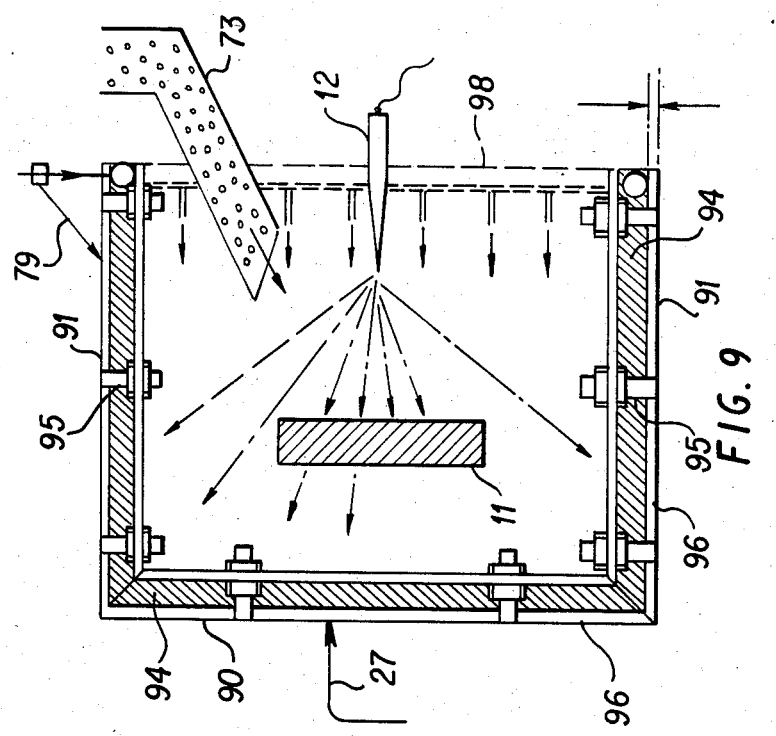
Figure 8:
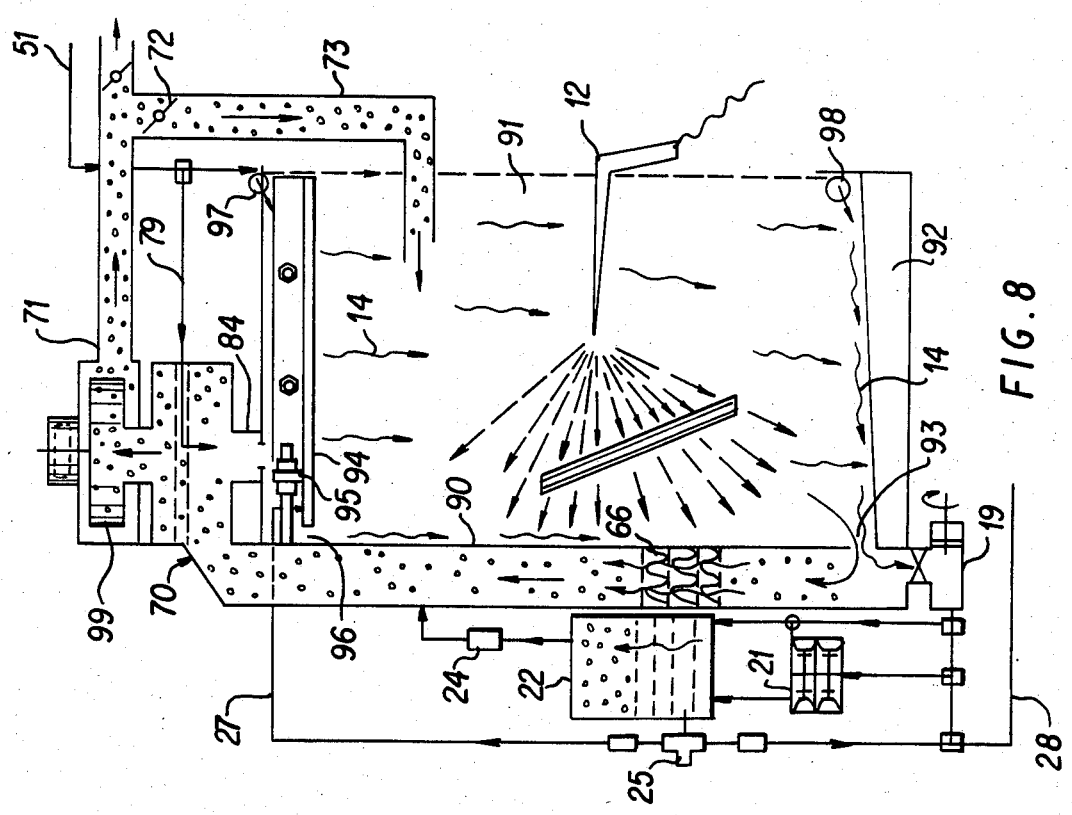

The invention also concerns a device to carry out the process described above. The drawings illustrate schematically a design example of the invented device to carry out the process as follows:

FIG. 1 an illustration of the invented process with the various components of the device FIG. 2 a spraying booth with moving wall segments FIG. 3 the top view of three wall segments FIG. 4 a section through a wall segment FIG. 5 a perspective view of a wall segment FIG. 6 a section through the filter membrane of the filtration chamber FIG. 7 a section through the wet filter FIG. 8 a section through a layout of the collector device FIG. 9 a top view of the collector device in FIG. 8

Figure 10:
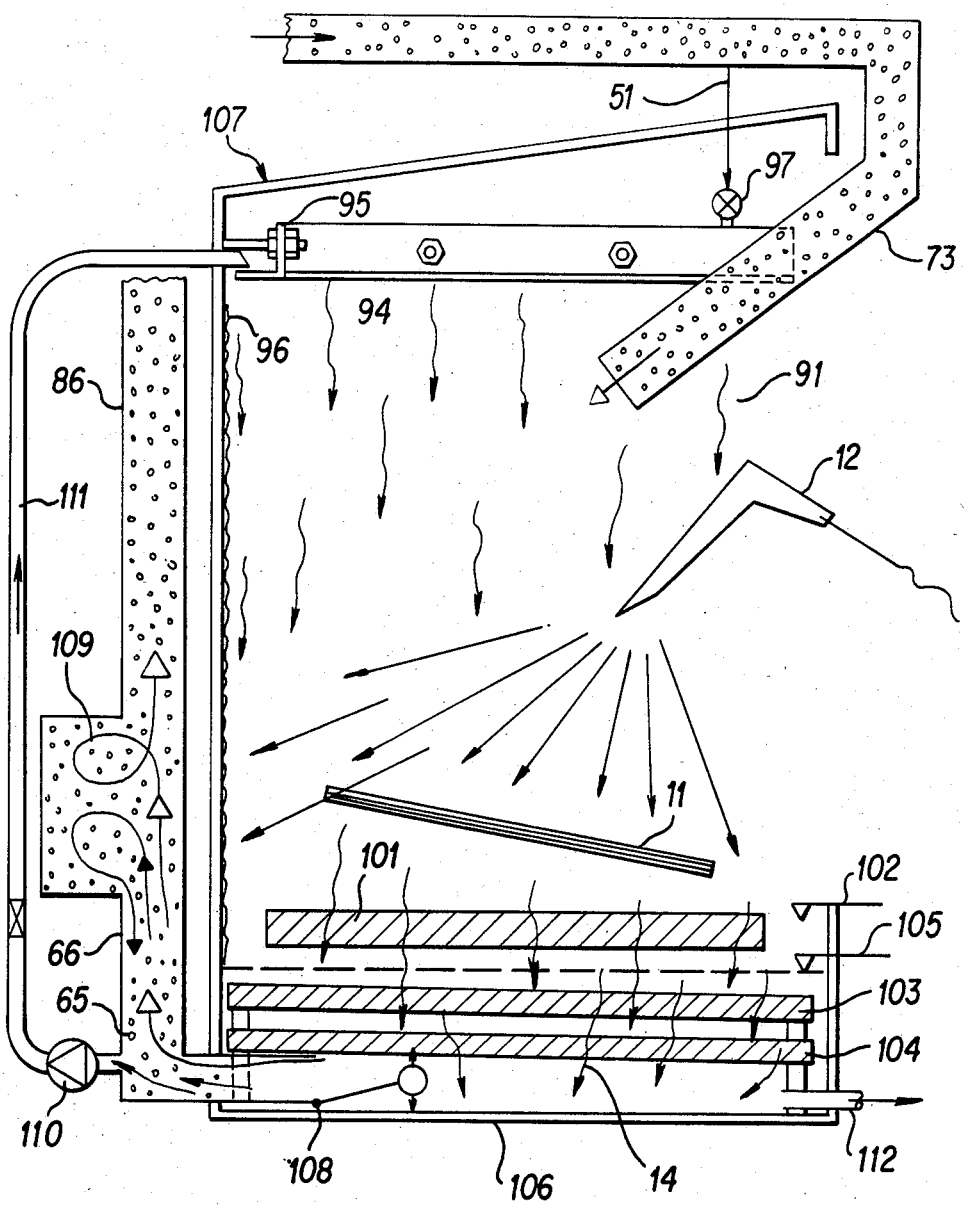

FIG. 10 a layout of the collector device.

In FIG. 1 the overspray collector device as a whole is designated 1. The collector device can consist of chambers or cabins made up of individual or grouped modules. The size of the collector device will depend on the size of the object to be sprayed and the throughput during continuous spraying operations. The collector device invented is suitable for small table-top models as well as for large mass production spraying systems, for instance for buses and wagons. The principle of the device invented is valid for all sizes and layouts.

The collector device consists mainly of collector surfaces made up of rotating segments which are built into a cassette form of individual elements, thus forming a collector surface. On the side towards the spray target the cassette surface is washed continuously with circulating water which absorbs the overspray as precipitant. From the rear side the segments are cleaned by means of special spray devices in an integrated washing chamber while the sides towards the spray target are again used as collectors for the overspray (13).

The spraying booth consists of a floor surface (2) whereby the floor surface is made up of rotating segments (3). This rotating segment should preferably be a triangular segment with three wall surfaces (4, 4a und 4b) whereby these surfaces are built into a cassette segment using edge seals (5). The edge seal (5) should preferably be of polyamide, of a polyolefine or of halogenized plastics. The rotating segments should preferably be mounted longitudinally on an axle (6). The wall surfaces of the cassettes should preferably be of stainless steel or of plastic, e.g. polyamide, polyolefine or of a halogenized carbohydrate polymerizate. The rotating segments will be driven by a motor whereby the segments will turn from their starting point by one surface unit at a time so that on the third cycle they return to the starting position. In FIG. 3 the drive roller is designated 7. The idler rollers and idler cogwheels are designated 8.

The segments (3) are combined in the floor of the spraying booth to make a floor surface (2) whereby a waterproof surface is formed by the edge seals of the individual segments which should be of an elastic material, preferably of an elastic plastic material. A grid plate could be fitted above the floor surface (2) as a platform for operating personnel.

The vertical wall surfaces of the spraying booth also consist of rotating individual segments (3), which make up a continuous wall surface whereby the touching edges are formed by the edge seals (5). The spraying booths which are equipped for a continuous spraying operation are provided with an entrance opening (9) and an exit opening (10) through which the object to be sprayed (11) is moved into the interior of the booth in front of the spray nozzles (12). For booths not intended for continuous spraying the rear wall of the chamber is not provided with an opening.

The vertical wall surfaces of the spraying booth consisting of rotating segments are flooded with circulating water (14). The water forms a thin continuous film on the vertical surfaces which absorbs the overspray. The flooding of the vertical surfaces with water-overspray mixture from the circuit and/or fresh water is achieved by spray devices (15, 15a) which are mounted in the upper part of the spraying booth. The spray devices (spray nozzles) (15) and (15a) are supplied with the circulating water-overspray mixture by line (27) or with fresh water by line (51). The rearward facing segment sides are washed by water from nozzles (17) mounted outside the booth to clean them of paint residue. The nozzles to clean the floor segments are designated (16) and those to clean the vertical segments (17). The floor surface (2) is flooded with the water-overspray mixture or with fresh water by a spray system (18) mounted in the lower part of the booth which is connected with the spray system (15) by means of line (29). The overspray captured in the water moves via a pump (19) and a line (20) into the inline-disperser (21). The inline disperser (21) serves to homogenize the overspray-circulating water mixture and to temporarily stabilize it. The homogenized overspray-circulating water mixture is, where necessary, fed from the disperser (21) into the relief chamber (22) which is fitted with baffles.

The air and gaseous content separated in the relief chamber (22) are ducted via a vacuum unit (24) into the collector device exhaust flow (1). A defoaming agent can be dose fed into the relief chamber (22) and, if necessary, also into the intake line (20) to the inline disperser. However this will only take place when using special paint mixtures. Normally the invented process will function with no additives at all, because the reclaimed raw paint is intended to be mixed back into the fresh material.

The relief chamber (22) is connected to a pump (25) which distributes the extracted mixture between lines (27) and (28) using distribution valves (26 and 26a). When commencing spraying operations the majority of the mixture is fed back via line (27) into the collector device (1) and thus back into circulation. A part of the mixture taken from the side of the relief chamber (22) is fed through line (28) into the recycling unit which is designated in its entirety as (30). This portion of the overspray-circulating water mixture moves via line (28) into the intake collector tank (31) and from there by pump (32) into the filtration chamber (33). The quantity of mixture fed into the filtration chamber (33) is regulated by the pump (32) which is controlled by the liquid level in the collector tank (31).

The water used to wash the outside surfaces of the segments making up the spraying chamber is collected in a floor sump (34) and fed via line 35 to the wash water collector tank (36). A pump (37) is connected to the collector tank (36) which is inter-connected with the pump (32) of collector tank (31) (see FIG. 1). The filtration chamber (33) consists of different sequentially arranged filter membranes made of inorganic filler materials whereby the fine grained fillers have cavities of a diameter 0.001 to 0.05 μm. The fine-grained filler materials are attached by epoxy resins or by halogenized carbohydrate polymerizates to a filter membrane (39) whereby the base material can be used both to hold the membrane together and as a prefilter. It is also possible to use filter membranes made up of a mixture of organic and inorganic materials. It is even possible to use a filter membrane of organic materials. The structure of the filter membranes is illustrated in FIG. 6.

The outer structure of the filler materials can vary, i.e. cylindrical, flat, angular and/or tubular. The individual filler particles are designated (40) and the cavities in the particles (41). The membrane (39) can have filler materials of various shapes. The matrix for the filler material of epoxy resin or halogenized carbohydrate is designated (42). The base material (43) consists of a rigid plastic such as polyamide or of stainless steel.

A constant circulation is maintained in the filtration chambers by a high pressure pump to avoid blockage of the filler material. Feeding the overspray-circulating water mixture through the filter unit concentrates the mixture into raw paint.

This raw paint is then fed via the collector line (45) into the measuring section, which as a whole is designated as (50), whereby the flow of the raw paint from the various compartments of the filtration chamber from fine filtration to coarse filtration is controlled by the central valve (46). The pipe lines marked with circles can also be used as rinse pipes.

When the overspray-circulating water mixture is conducted through the cavities of the filler material the clear water penetrates and is drained at the end of the fine filter chamber (44) through line (47) and is collected in the clear water collector tank (48). The membranes in the filter chamber can be washed back from both sides, i.e. from inside and from outside with the available pipes. The recycled clear water is then fed via line (49) into the collector device (1) to wash the spraying chamber wall elements. To compensate for the used circulation water fresh water is fed into the collector tank (48) via line (51a). Fresh water can also be fed by line (51) direct into the collector device (1).

Part of the clear water extracted from the filtration chamber can, instead of being recycled into the system, be let off into the drainage.

The raw paint extracted from the filtration chamber is fed into the measuring section (50). Here measuring unit (51) measures the flow quantity, measuring unit (52) the specific gravity, unit (53) the refractive index or Tyndall effect, unit (54) the viscosity, unit (55) the pH value and unit (56) the conductivity of the raw paint. These are then compared with the corresponding values of the fresh paint material (57).

The data received from measuring units (51) and (52) control the central valve (46). The mixing unit (58) is controlled by means of a probe (64) using the measuring data received from measuring units (54, 55) and/or (56). An inline disperser (59) and a pump (60) for the fine sieve (61) are connected to measuring unit (53). The raw paint is taken from the stirring unit (58) to the mixing tank (62) via the inline disperser (59), the pump (60) and where necessary via a fine sieve assembly (61) to remove coarse particles of hardened material. In the mixing tank (62) the recycled raw paint is mixed with fresh material. Depending on the consistence of the reclycled paint, however, it is possible to feed the material from the stirring unit (58) directly into the mixing tank (62) by leaving out the inline disperser (59) and/or the fine sieve (61). The mix ratio between recycled and fresh paint will depend on the output at the spray nozzle (12). The mix ratio of fresh paint to recycled paint will normally lie between 10:1 and 1:10, preferably at approximately 1:1. A mix ratio of 1:1 corresponds roughly to an overspray rate of 50%.

The mixing tank (62) is connected to the spray nozzle (12) by line (63).

The exhaust air from the spraying booth is removed by a suction chamber (65) installed in the lower part of the spraying booth and is then fed through a rinsing unit (66). The rinsing unit (66) consists of a cyclonic washer.

Here the majority of the overspray (13) is separated from the exhaust air.

The overspray laden exhaust air is then fed into a wet filter shown as (70). In this wet filter the exhaust air is cleaned of overspray remnants. The cleaned air then returns via line (71) and throttle valve (72) through line (73) into the collector device. A proportion of the cleaned exhaust air can also be released into free air by throttle valve (74).

The wet filter is illustrated in detail in FIG. 7. The wet filter consists of a lower condensation chamber (75) and an upper condensation chamber (76). The exhaust air is fed into the lower condensation chamber from the side as shown by arrows in FIG. 7.

The air inlet is designated (77). The exhaust air then flows through coarse filter (78) which is mounted above the inlet. The coarse filter should preferably be of glass fibre materials and is sprayed from above with rinse water by a spray device (79). Above spray device (79) a medium fine filter (80) is fitted, which should preferably consist of glass-fibre materials. After the exhaust air has passed through the medium fine filter (80) it hits condensation plate (81) where the last remnants of the overspray are separated from the exhaust air. Above the condensation plate a further upper fine filter (82) should preferably be provided, which is designed as a dry filter. This upper fine filter will remove any last residues of overspray. The cleaned exhaust air is then released into the open air or returned into the collector device by line (71). On the bottom (83) of the wet filter the spray water with the overspray extracted from the exhaust air is collected and is returned into the circulating water through line (84). This line (84) should preferably by fitted with a nonreturn valve (85). The condensation plate (81) should preferably be made of stainless steel and is provided with perforations (86).

At commencement of spraying operations the wet filter (70) is flooded by line (79). The liquid collecting in the wet filter flows via the exhaust air collector line (86) through the cyclonic washer (66) and the run-off suction chamber (65) into pump (19) and thus back into the circulating water. Before commencement of spraying the side surfaces of the spraying booth are washed with water and the overspray-circulating water mixture draining off after commencement of spraying is fed via the pump (19), line (20), the inline disperser (21) and where necessary via the relief chamber (22), the pump (25) and line (27) into the exhaust air collector (86). During the start-up phase of the process the distributor valve (26a) is closed to line (28) until the overspray-circulating water mixture has been concentrated by the closed circulation to an overspray content of approx. 20%.

Only when this overspray content has been achieved is valve (26a) opened and the overspray-circulating water mixture fed via line (28) into the collector tank (31).

The invented device has the advantage that the colour of the paint being sprayed or even the type of paint material used can be changed without time consuming reconfiguration. During a change of colour or material the flow of the "old" fresh paint from the delivery system (not illustrated in FIG. 1) to the mixing chamber (62) is interrupted. The mixing chamber (62) continues to feed what recycled "old" paint is collected into the fresh paint container and then finally rinses the remaining wash water from the recycling unit (30) into the same fresh paint container or into another special container. After the operation is complete the fresh paint of the new colour is fed into the mixing chamber (62) and via line (63) into the spray nozzle (12). At the same time line (28) is reopened and recycling of the paint with the new colour from the overspray commences. For large object surfaces to be sprayed, i.e. from 1000 $m^2/h$, which need to be sprayed in different colours and types of material the following components will be required in multiple arrangement, preferably in triple arrangement: recycling unit (30), relief chamber (22), inline disperser (21) and wet filter (70). Multiple spraying booths are not necessary, because by rotating the wall segments (3) the booth can immediately be used for a spraying operation with a new colour. The individual wall segments are turned to prepare the booth for the new operation. The sides of the segments turned away from the interior of the chamber are cleaned immediately after turning by washing with water from the outside so that the cleaned sides (4, 4a) or (4b) can be used as a collecting surface for the spraying operation.

FIG. 8 shows a layout for the invented device where the collector device for overspray consists of smooth, flooded runoff surfaces and whereby the vertical run-off surfaces are flooded with water by means of an adjustable slit. The smooth rear wall run-off surface is designated (90) and the smooth side run-off surface (91). The floor is designated (92). The floor (92) is sloped so that the water running off the vertical surfaces runs to the pump (19) through a slit (93) located at the rear wall (90). From there the overspray-circulating water mixture, as shown in FIG. 1, is fed up to the flooding channel (94) via the inline disperser (21) and where applicable the relief chamber (22) via the pump (25) and line (27).

The flooding channel (94) can be moved towards the wall (90) by a shift unit (95). Thus the width of the run-off slit (96) is adjusted. Fresh water for flushing of the wall surfaces is fed into the flooding channel (94) via line (51) and pipe (97) and via feed pipe (98) to the floor plate (92). Flush water flow via line (79) into the wet filter (70) is as described in FIG. 1.

Between the wet filter (70) and the exhaust air line (71) a fan (99) can be installed which will draw the exhaust air into the exhaust air line (71). Other components of the device are similar to the layout in FIG. 1 and reference is therefore made to the relevant parts in FIG. 1.

FIG. 9 shows a top view of the spraying booth in FIG. 8, whereby only the more important parts of the spraying booth are illustrated.

FIG. 10 shows a special version of the collector device (1) consisting of a semi-wet booth. This semi-wet booth is built in the same manner as the spraying booth of FIG. 8 with fixed smooth collecting surfaces (91) on each side and a smooth run-off surface for the circulating water on the rear wall. The rear wall is designated (100). The side walls and the rear wall are flooded with water by the flooding channel (94) which forms a flooding slit (96) with the side surfaces and rear wall. Adjustment of the flooding slit width is by means of a shift unit (95). On the floor (106) of the booth a filter is installed which consists of several, replaceable filter cassettes arranged one above the other.

The filter cassettes consist particularly of glass fibre textiles, polyester filler material and/or polyurethane filler material. The uppermost cassette (101) in the floor section is a cassette which perferably is used as a dry cassette and which consists of a glass fibre material.

This upper filter cassette (101) stays unflooded during the spraying operation. It is possible, however, if the filter cassette is to remain in the chamber after spraying has ended, to flood it with water to prevent the paint residue from drying. Flooding can be by means of a water level switch (102). Under filter cassette (101) is another replaceable filter cassette (103) and under that a further, equally replaceable, cassette (104). During spraying operations filter cassettes (103) and (104) are flooded with water by means of a water level switch (105) thus preventing passage of the majority of the overspray present in the extracted air. The overspray is absorbed by the flooding water (14). On the floor (106) of the spraying chamber (which is designated in its entirely as (107)) is a float valve (108) to regulate the mixture of extracted air and water. The exhaust air is fed via an suction chamber (65) and the cyclonic water (66) into the exhaust air duct (86) whereby an air vortex chamber can be installed after the cyclonic washer to remove any water carried in the air. The cleaned exhaust air is then returned to the spraying chamber via line (73). The air vortex chamber in the exhaust line is designated (109). The flooding water collected at the floor (106) is fed up to the flooding channel via the pump (110) and line (111). This closed circuit is intended for the start-up phase of the spraying operation. When the overspray-circulating water mixture has been concentrated to an overspray content of approx. 20% the concentrated mixture is fed by an outlet (112) fitted in the floor (106) of the spraying booth into lines (28) or (35) from where the mixture is conducted into collector tanks (31) or (36) where the reclaiming of the raw paint takes place. The advantage of the semi-wet booth shown in FIG. 10 is the ability to spray small components or components of a special shape alongside the main spraying operation, and this manually or automatically, or the ability to spray different materials in short series and thus to achieve a better elasticity in the production process.

What is claimed:

1. A device to carry out a process to recycle paint from the overspray occuring in spray painting, comprising a collector device for collecting overspray which is flooded with water-circulating in a closed system, means for concentrating the water overspray mixture in a collection tank, a filtration chamber connected to the collection tank for separating the mixture into water and raw paint, means for feeding the reclaimed water back into circulation, a measuring section (50) for measuring the physical characteristics of the reclaimed paint and comparing it to the physical characteristics of fresh paint, means for feeding the reclaimed paint to the measuring section, a reprocessing unit for adjusting the consistence of the raw paint according to the data determined in the measuring section, and means for mixing the thus reprocessed paint into the fresh paint to be sprayed, wherein the collector device (1) consists of wall surfaces which are made up of rotating segments, whereby the segments are completely flooded with circulating water.

2. A device according to claim 1, characterized in that the rotating segments consist of adjacently arranged triangular cassettes with wall surfaces (4, 4a, 4b), whereby the edges of the wall surfaces are sealed by edge seals (5).

3. A device according to claim 1, characterized in that the rotating segments (3) can be synchronously rotated by a drive roller.

4. A device according to claim 1, characterized in that the side walls and floor surfaces of the spraying booth are made up of rotating segments (3) whereby the segments are completely flooded with circulating water.

5. A device according to claim 1, characterized in that before feeding the water-overspray mixture into the collector tank (31) the mixture is fed through an inline disperser (21) to temporarily stabilize the emulsion and/or dispersion.

6. A device according to claim 1, characterized in that between the inline disperser (21) and the collector tank (31) a relief chamber (22) is fitted which extracts the gaseous content from the mixture.

7. A device according to claim 1, characterized in that a filtration chamber (33) is connected to the collector tank (31, 36), which consists of filtration chambers, controlled jointly or separately, which can be used in a sequence of coarse filtration after fine filtration or vice versa and which can be washed back jointly or separately.

8. A device according to claim 7, characterized in that the filtration chambers contain filtration membranes (39) consisting of hollow sections filled with organic or inorganic materials with a pore width between 0.05 to 0.001 $\mu m$.

9. A device according to one of the claim 7 or 8, characterized in that the measuring section (59) contains a unit to measure the refractive index or Tyndall effect of the raw paint leaving the filter chamber (33).

10. A device according to claim 1, characterized in that a cyclonic washer (66) and a downstream wet filter (70) are connected to the collector device (1) through which the overspray-laden exhaust air is transmitted in order to separate the overspray from the air and feed it into the circulating water.

11. A device according to claim 1, characterized in that the vertical wall surfaces made up of the rotating segments (3) can be flooded with water-overspray mixture and/or fresh water by means of spray devices or spray pipes (15, 15a) mounted in the upper part of the spraying booth and that the floor surface segments (2) can be similarly flooded by means of a spray device or spray pipe (18) mounted on the floor section.

12. A device to carry out a process to recycle paint from the overspray occurring in spray painting, comprising a collector device for collecting overspray which is flooded with water-circulating in a closed system, means for concentrating the water overspray mixture in a collection tank, a filtration chamber connected to the collection tank for separating the mixture into water and raw paint, means for feeding the reclaimed water back into circulation, a measuring section (50) for measuring the physical characteristics of the reclaimed paint and comparing it to the physical characteristics of fresh paint, means for feeding the reclaimed paint to the measuring section, a reprocessing unit for adjusting the consistence of the raw paint according to the data determined in the measuring section, and means for mixing the thus reprocessed paint into the fresh paint to be sprayed, wherein the collector device (1) comprises fixed side surfaces (90, 91, 100) and a flooding slit (96) for flooding said side surfaces and a floor section comprising at least three filter cassettes arranged one above the other, whereby the uppermost filter cassette (101) is a dry cassette and the lower cassettes (103, 104) are wet filter cassettes and each of said cassettes can be flooded and wherein the fixed side surfaces (90, 91, 100) can be flooded with fresh water and/or circulating water-overspray mixture by means of said flooding slit (96).

13. A device according to claim 1 or 12, characterized in that in the floor section of the collector device (1) at least three filter cassettes (101, 103, 104) are arranged one above the other, whereby the upper filter cassette consists of a dry cassette and the lower cassettes consist of wet filter cassettes.

* * * * *